(12) United States Patent
Proux

(10) Patent No.: US 7,957,956 B2
(45) Date of Patent: *Jun. 7, 2011

(54) SYSTEMS AND METHODS FOR NORMALIZATION OF LINGUISTIC STRUCTURES

(75) Inventor: Denys Proux, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 253 days.

This patent is subject to a terminal disclaimer.

(21) Appl. No.: 12/193,118

(22) Filed: Aug. 18, 2008

(65) Prior Publication Data

US 2008/0312908 A1 Dec. 18, 2008

Related U.S. Application Data

(63) Continuation of application No. 10/739,214, filed on Dec. 19, 2003, now Pat. No. 7,440,890.

(51) Int. Cl.
*G06F 17/27* (2006.01)
(52) U.S. Cl. ......................... 704/9; 704/7; 704/8; 704/10
(58) Field of Classification Search ................... 434/166, 434/167
See application file for complete search history.

(56) References Cited

U.S. PATENT DOCUMENTS

| 5,684,999 | A | | 11/1997 | Okamoto |
| 5,708,822 | A | | 1/1998 | Wical |
| 5,966,686 | A | * | 10/1999 | Heidorn et al. ................... 704/9 |
| 6,446,081 | B1 | * | 9/2002 | Preston ................................ 1/1 |

OTHER PUBLICATIONS

Proux et al., Denys "Muninn: A Pragmatic Information Extraction System," String Processing and Information Retrieval, 2000. SPIRE 2000. Proc., Seventh Int'l Symposium on Sep. 27-29, 2000, IEEE, pp. 236-241.
Goldman, Neil "Sentence Paraphrasing from a Conceptual Base," Communications of the ACM USA, vol. 18, No. 2, Feb. 1975, pp. 96-106.

* cited by examiner

*Primary Examiner* — Leonard Saint Cyr
(74) *Attorney, Agent, or Firm* — Oliff & Berridge, PLC.

(57) ABSTRACT

A text passage is analyzed to determine whether it contains a "be" verb or a "have" verb. If so, syntactic dependencies are obtained from the text passage, a direct object relation involving the "be" verb or "have" verb is obtained, and a verbal form of a noun appearing in the first direct object relation is obtained. The syntactic dependencies are rewritten based on the verbal form of the noun. Different syntactic rewriting criteria are applied if the text passage also contains a noun object preceding a past participle verb, or also contains an active present participle verb.

7 Claims, 7 Drawing Sheets

SYSTEMS AND METHODS FOR NORMALIZATION OF LINGUISTIC STRUCTURES

This is a Continuation of application Ser. No. 10/739,214 filed Dec. 19, 2003 now U.S. Pat. No. 7,440,890. The disclosure of the prior application is hereby incorporated by reference herein in its entirety.

BACKGROUND OF THE INVENTION

1. Field of Invention

This invention relates to systems and methods for normalizing linguistic structures.

2. Description of Related Art

Information retrieval tools are widely known which select text passages matching user criteria according to key words input by the user. These tools typically retrieve all available text passages that contain the key words, but do not apply linguistic and semantic and/or semantic analysis to the text passages.

Christian Jacquemin, in a paper entitled "Variation terminologique: Reconnaissance et acquisition automatique de termes et de leurs variants en corpus" (Terminological variation: identification and automatique extraction of terms and their variations from corpora"), discusses techniques to improve the access to textual database contents. The techniques discussed by Jacquemin involve morpho-syntactic variations of words, and focus on identifying similar terms or linguistic expressions in documents. However, there is no re-writing of text passages into a normalized syntactic structure.

Other operations that may be performed on text passages include Information Extraction and Discourse Processing. These operations are applied in the context of, for example, an automatic translation system in which a user inputs text to be translated into another language, and the system performs the translation, or a natural language querying system, in which a user inputs a query or search request in natural language form, such as "How is the BicD gene repressed?" For information extraction or discourse processing, semantic relationships between described entities are needed. Information processing at this level is typically performed using an extraction of syntactic dependencies and then pattern matching to detect predetermined patterns of information. At this level, natural language complexity is a problem because it gives the possibility for a same piece of information to be expressed using many different linguistic constructions. Therefore, to capture a specific information in a text passage, the pattern designer has to anticipate these linguistic structures and write all the possible pattern variations. For example, consider the sentence:

Antp protein is a repressor of the BicD gene.

This sentence describes an action of repression between the entity "Antp protein" and the entity "BicD gene". This information can be extracted by the following pattern:

X is a repressor of Y

But the same fact may also have been described by the following sentences:

Antp protein represses the BicD gene.
Pattern: X represses Y
Antp protein has a repressive effect on the BicD gene.
Pattern: X has a repressive effect on Y and so on. This implies a large collection of patterns to get one simple piece of information.

SUMMARY OF THE INVENTION

An object of this invention is to enable the normalization of text passages, that is, the modification of the syntactic structure of complex sentences into a standardized and simpler one, reducing therefore the number of patterns necessary to get the same information.

The invention extracts syntactic dependencies and modifies the syntactic dependencies using syntactic rewriting rules and derivational morphology. The invention requires no previous semantic knowledge to operate. It can be purely lexical and syntactic. The exemplary embodiments described in detail below operate on sentences containing "be" or "have" verbs, but it should be appreciated that the invention can also apply to other verbs provided that the corresponding rewriting rules are specified.

In embodiments, the invention replaces a too-generic "be" or "have" verb inside a sentence by the verbal form of the most characteristic noun of the sentence. For example, the sentence Antp protein is a strong repressor of the BicD gene.

would be modified to:

Antp protein strongly represses the BicD gene.

| is | → | 0 |
| repressor | → | repress |
| strong | → | strongly |

The sentence

Antp protein has a repressive effect on the BicD gene.

would be modified to:

Antp protein represses the BicD gene.

| has | → | 0 |
| repressive | → | repress |
| effect | → | 0 |

The invention may be applied to, for example, automatic translation tools, to reduce the complexity of text and thereby increase the accuracy of translations. Other applications include information extraction systems such as database search engines, and question answering tools.

These and other objects, advantages and salient features of the invention are described in or apparent from the following description of exemplary embodiments.

BRIEF DESCRIPTION OF THE DRAWINGS

Exemplary embodiments of the invention will be described with reference to the drawings, wherein like numeral represent like parts, and wherein.

DETAILED DESCRIPTION OF PREFERRED EMBODIMENTS

This invention simplifies complex passages based on syntactic dependencies using syntactic rewriting rules and derivational morphology.

Figure 1:
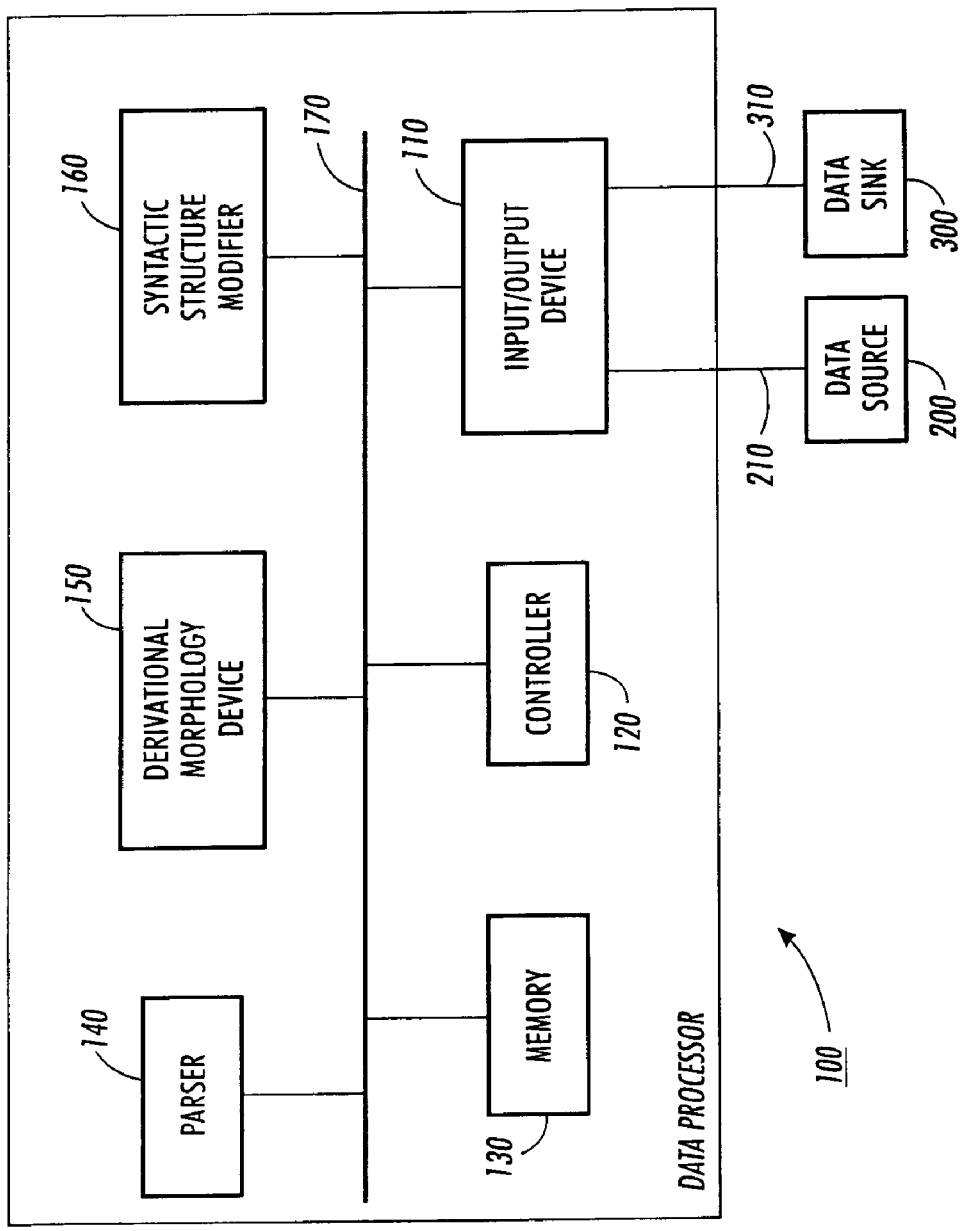
FIG. 1 is a functional block diagram illustrating an exemplary embodiment of a data processor according to the invention.

FIG. 1 is a functional block diagram illustrating an exemplary embodiment of a data processor 100 according to the invention. The data processor 100 includes an input/output interface 110, a controller 120, a memory 130, a parser 140, a derivational morphology device 150, and a syntactic structure modifier 160, which are interconnected by a data/control bus 170. The input/output interface 110 is connected to a data source 200 via a link 210, and to a data sink 300 via a link 310.

The data source 200 can be a locally or remotely located computer or database, or any other known or later developed device that is capable of generating electronic data. Similarly, the data source 200 can be any suitable device that stores and/or transmits electronic data, such as a client or a server of a network. The data source 200 can alternatively be a portable storage medium such as a magnetic or optical disk that is accessed by a suitable disk drive located within or externally of the data processor 100. The data source 200 can be connected to the data processor 100 over a connection device, such as a modem, a local area network, a wide area network, an intranet, the Internet, any other distributed processing network, or any other known or later-developed connection device. The data source 200 may be an output from another processor or device (not shown), such as a search engine or an automatic translation tool at which a user has input a request.

It should also be appreciated that, while the electronic data can be generated just prior to, or even while, being processed by the data processor 100, the electronic data could have been generated at any time in the past. The data source 200 is thus any known or later-developed device which is capable of supplying electronic data over the link 210 to the data processor 100. The link 210 can thus be any known or later-developed system or device for transmitting the electronic data from the data source 200 to the data processor 100.

The data sink 300 can be any known or later-developed system capable of receiving the electronic data processed by the data processor 100 over the link 310. Typically, a user will not directly view the results of the data processor 100. Rather, the user will typically review information obtained, in part, as a result of the processing of the data processor 100. For example, if the data processor 100 is part of a database search engine, the user may type in a search request, for example, in natural language. An example of a natural language search request typed by a user is, "How is the BicD gene repressed?" Relevant text passages would then be extracted from a database and returned for the user to view. As another example, if the data processor 100 is part of an automatic translation tool, the user may input text to be translated, and then view the translation after processing of the translation request is complete.

Thus, the direct result of the processing of the data processor 100 is typically invisible to the user, and is used by a system to obtain or generate other information to display to the user. Therefore, the data sink 300 may be an input to another processor or device, such as a search engine or an automatic translation tool, which in turn is connected to a data sink such as a computer or television monitor, a marking engine or the like. The data sink 300 can also be a device, such as a magnetic or optical storage disk, a computer memory, or the like, for storing the processed data for later input.

It should also be appreciated that the data processor 100 may be directly incorporated into a larger system, such as a search engine, automatic translation tool or the like. In this case, the parser 140, derivational morphology device 150 and/or the syntactic structure modifier 160 may be linked directly to the larger system, and the input/output interface 110, the controller 120 and/or the memory 130 may be unnecessary.

Either or both of the links 210 and 310 can be a direct link, such as one or more electric and/or optical cables. Either or both of the links 210 and 310 can also be a local area network, a wide area network, the Internet, an intranet, or any other distributed processing and storage network. Moreover, either or both of the links 210 and 310 can also be or include a wireless link.

The controller 120 controls the operation of other components of the data processor 100 as necessary, performs any necessary calculations and executes any necessary programs for implementing the processes of the data processor 100 and its individual components, and controls the flow of data between other components of the data processor 100 as needed.

The memory 130 may serve as a buffer for information coming into or going out of the data processor 100, may store any necessary programs and/or data for implementing the functions of the data processor 100, and/or may store data at various stages of processing. Furthermore, it should be appreciated that the memory 130, while depicted as a single entity, may actually be distributed. Alterable portions of the memory 130 are, in various exemplary embodiments, implemented using static or dynamic RAM. However, the memory 130 can also be implemented using a floppy disk and disk drive, a writeable optical disk and disk drive, a hard drive, flash memory or the like. The generally static portions of the memory 130 are, in various exemplary embodiments, implemented using ROM. However, the static portions can also be implemented using other non-volatile memory, such as PROM, EPROM, EEPROM, an optical ROM disk, such as a CD-ROM or DVD-ROM, and disk drive, flash memory or other alterable memory, as indicated above, or the like.

The parser 140 is used to extract syntactic dependencies from an input passage of text, typically a single sentence. An example of a suitable parser is the product MACHINESE SYNTAX, available from Connexor, a corporation of Finland, but it should be appreciated that any parser capable of extracting syntactic dependencies, such as the dependencies described hereafter, of words within a text passage, particularly within a sentence, is acceptable.

Derivational morphology is a lexical process that splits an input word into its radical and its ending, and generates possible words that can be constructed using the same radical. Thus, for example, starting from the word "operation," the derivational morphology device 150 generates the nouns "operator, operability", the verb "operate", the adjective "operational", and the adverb "operationally." One example of a derivational morphology device is a linguistic services platform available under the name XELDA from Temis, a corporation of France, but it should be appreciated that any device or program capable of generating one or more different words from a given radical may be acceptable. It will be appreciated from the following description that the invention may only use one of the possible words generated, e.g., a verbal form of the word, and hence it may not be necessary for the derivational morphology device 150 to actually generate all possible forms of the word.

The syntactic structure modifier 160 modifies, or rewrites, syntactic dependencies according to various criteria, using information obtained from the parser 140 and/or from the derivational morphology device 150.

It should be understood that various ones of the elements shown in FIG. 1, such as the parser 140, derivational morphology device 150 and/or the syntactic structure modifier 160, can be implemented as portions of a suitably programmed general purpose computer. Alternatively, they can be implemented as physically distinct hardware circuits within an ASIC, or using a FPGA, a PDL, a PLA or a PAL, or using discrete logic elements or discrete circuit elements. The particular form each of the elements shown in FIG. 1 will take is a design choice and will be obvious and predictable to those skilled in the art.

Figure 2:
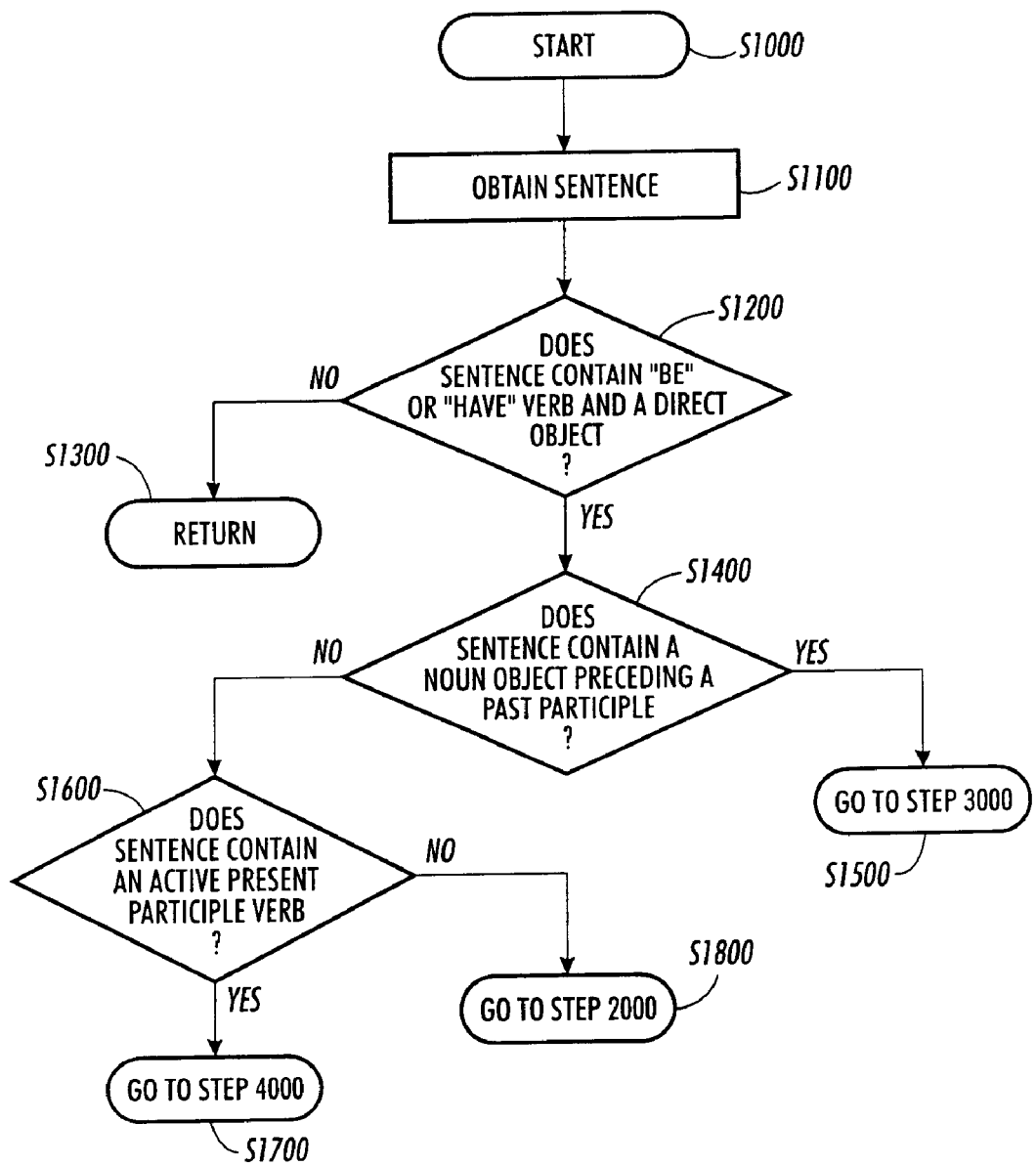
FIG. 2 is a flowchart illustrating an exemplary method of normalizing a linguistic structure according to the invention.

FIG. 2 is a flowchart illustrating an exemplary method of normalizing a linguistic structure according to the invention. In FIG. 2, the method begins at step S1000 and continues to step S100 and obtains a sentence. The sentence may, for example, be obtained from a text passage from a database that is a candidate for extraction and display to a user, or may be a passage of text that is typed or selected by the user to be translated into another language. The method then continues to step S1200, where it is determined whether the sentence contains a "be" or "have" verb and a direct object. If the sentence does not contain a "be" or "have" verb and a direct object, the method continues to step S1300 and returns. In other words, the sentence is determined to already be in a simple form, and requires no further modification. On the other hand, if the sentence does contain a "be" or "have" verb and a direct object, the method jumps to step S1400.

In step S1400, it is determined whether the sentence contains a noun object preceding a past participle. If the sentence contains a noun object preceding a past participle, the method continues to step S1500 and executes the sub-method illustrated in FIG. 4. Otherwise, the method jumps to step S1600.

In step S1600, it is determined whether the sentence contains an active present participle verb. If the sentence contains an active present participle verb, the method continues to step S1700, and performs the sub-method illustrated in FIG. 7. Otherwise, the method jumps to step S1800, and performs the sub-method illustrated in FIG. 3.

Figure 3:
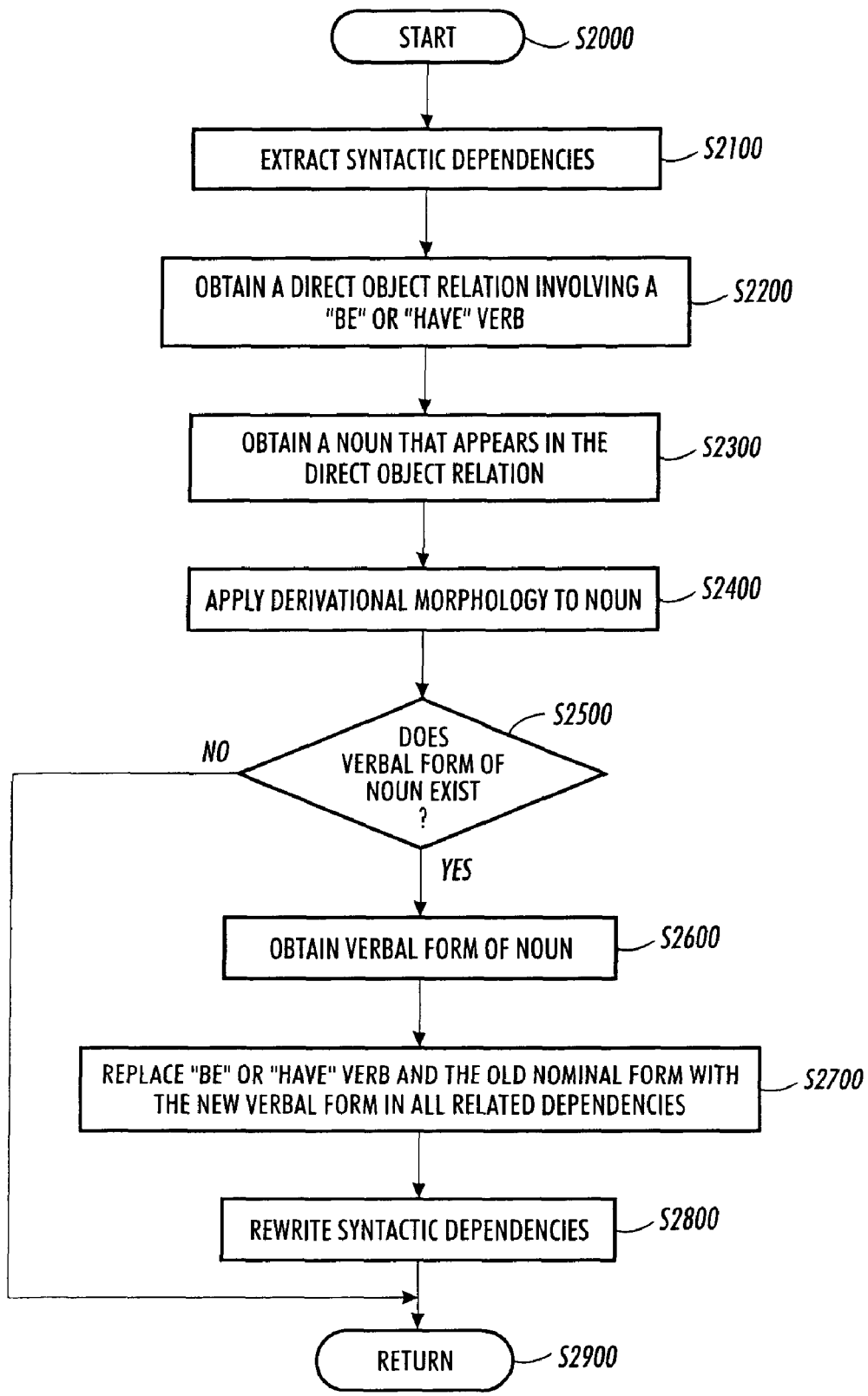
FIG. 3 is a flowchart illustrating a first exemplary sub-method of normalizing a linguistic structure according to the invention.

FIG. 3 is a flowchart illustrating a first exemplary sub-method of normalizing a linguistic structure according to the invention. In FIG. 3, the sub-method begins at step S2000 and continues to step S2100, where syntactic dependencies are extracted from the sentence.

For example, if the sentence obtained at step S1100 of FIG. 2 were the sentence Antp protein is a strong repressor of the BicD gene.
then the syntactic dependencies extracted may be:
SUBJECT (protein, be)
DIRECT OBJECT (be, repressor)
INDIRECT OBJECT (be, of, gene)
ADJECTIVE (strong, repressor)
NOUN MODIFIER (repressor, of, gene)
NOMINAL PHRASE (a strong repressor)
PREPOSITIONAL PHRASE (of the BicD gene)
NOMINAL PHRASE (Antp, protein)

The method then continues to step S2200, and obtains a direct object relation involving a "be" or "have" verb. In this example, the direct object relation involving a "be" or "have" verb is
(Be, repressor).

The method then continues to step S2300, and obtains the noun that appears in the direct object relation. In this example, the noun that appears in the direct object relation is:
Repressor.

The method then continues to step S2400 and applies derivational morphology to this noun. In this example, the possible derivations obtained are:

| | |
|---|---|
| repression | NOUN |
| repressive | ADJECTIVE |
| repress | VERB |

The method then continues to step S2500, and determines whether a verbal form of the noun exists. If a verbal form does exist, the method continues to step S2600. Otherwise, the sentence cannot be further simplified. Therefore, the method jumps to step S2900 and returns, leaving the sentence unchanged.

In step S2600, the verbal form of the noun is obtained. In this example, the verbal form is:
repressed.

The method then continues to step S2700, and replaces the "be" or "have" verb and the old nominal form with the new verbal form in all related dependencies. The result of step S2700 in this example is shown below in Table 1.

TABLE 1

| Before | After |
|---|---|
| SUBJECT (protein, be) | SUBJECT (protein, repress) |
| DIRECT OBJECT (be, repressor) | DIRECT OBJECT (repress, repress) |
| INDIRECT OBJECT (be, of, gene) | INDIRECT OBJECT (repress, of, gene) |
| ADJECTIVE (strong, repressor) | ADJECTIVE (strong, repress) |
| NOUN MODIFIER (repressor, of, gene) | NOUN MODIFIER (repress, of, gene) |
| NOMINAL PHRASE (a strong repressor) | NOMINAL PHRASE (a strong repress) |
| PREPOSITIONAL PHRASE (of the BicD gene) | PREPOSITIONAL PHRASE (of the BicD gene) |
| NOMINAL PHRASE (Antp, protein) | NOMINAL PHRASE (Antp, protein) |

The method then continues to step S2800, and rewrites the syntactic dependencies.

The rewriting of the syntactic dependencies involving the new verbal form is performed according to specific criteria. For example, the criteria may be:

```
DIRECT OBJECT (X, X) → 0
If ∃ ( INDIRECT OBJECT (X, prep, Y) and
    NOUN MODIFIER (X, prep, Y) and
    ( prep = "Of" for a "Be" verb or
      prep = "On" for a "Have" verb
    )
)
then  (  ( INDIRECT OBJECT (X, prep, Y) → DIRECT
            OBJECT (X, Y))
        and(NOUN MODIFIER (X, prep, Y) → 0 )
)
ADJECTIVE (Adj, X) → ADVERB (Adv, X)
The adverbial form of the adjective (Adj) has been created
using derivational morphology → (Adv)
NOMINAL PHRASE ( ... X ... ) → 0
        (nominal phrase containing the new verbal form)
```

In this example, the result of the syntactic dependency rewriting is as shown below in Table 2.

TABLE 2

| Before | After |
|---|---|
| SUBJECT (protein, repress) | SUBJECT (protein, repress) |
| DIRECT OBJECT (repress, repress) | |
| INDIRECT OBJECT (repress, of, gene) | DIRECT OBJECT (repress, gene) |
| ADJECTIVE (strong, repress) | ADVERB (strongly, repress) |
| NOUN MODIFIER (repress, of, gene) | |
| NOMINAL PHRASE (a strong repress) | |
| PREPOSITIONAL PHRASE (of the BicD gene) | PREPOSITIONAL PHRASE (of the BicD gene) |
| NOMINAL PHRASE (Antp, protein) | NOMINAL PHRASE (Antp, protein |

At this point, the initial sentence can be rewritten as:

Antp protein represses the BicD gene.

This rewritten sentence may be displayed to the user, if desired. It should be appreciated, however, that the new syntactic dependencies typically will be the final result of the sub-method, and an actual sentence does not necessarily have to be generated based upon them. For example, in the context of an information extraction tool such as a search engine, once the data processor 100 determines the new syntactic dependencies, it may have enough information to determine whether a candidate passage of text is appropriate for display to the user. In the context of an automatic translation tool, the user typically will only view the final result of the translation.

Finally, the method continues to step S2900 and returns.

Figure 4:
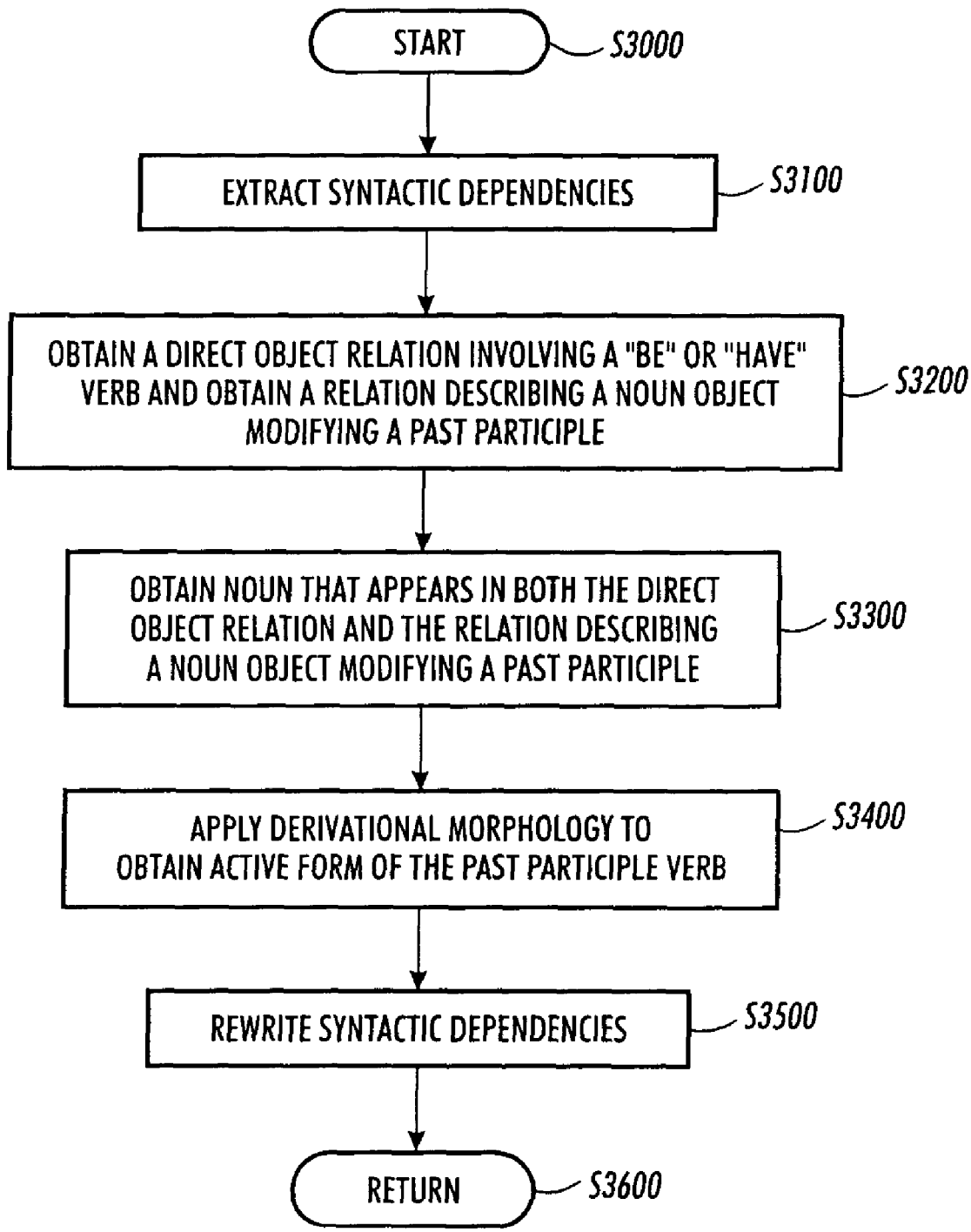
FIG. 4 is a flowchart illustrating a second exemplary sub-method of normalizing a linguistic structure according to the invention.

FIG. 4 is a flowchart illustrating a second exemplary sub-method of normalizing a linguistic structure according to the invention. The sub-method illustrated in FIG. 4 is used in the case of a sentence containing a "be" verb and a noun object preceding a past participle. For example:

Antp is a local inhibitor activated in embryonic cells.

With this sentence, using the sub-method of FIG. 3 would yield:

Antp locally inhibits activated in embryonic cells.

which is not grammatically correct. Therefore, the sub-method of FIG. 4 is used instead.

The sub-method of FIG. 4 starts in step S3000 and continues to step S3100, where the syntactic dependencies are extracted from the sentence. Continuing to step S3200, the method obtains a direct object relation involving a "be" or "have" verb, and obtains a relation describing a noun object modifying a past participle (referred to below as "NOBJ-PAST-PART"). For example, the relations obtained from the sentence in this example are:

| SUBJECT | (Antp, be) |
|---|---|
| DIRECT OBJECT | (be, inhibitor) |
| INDIRECT OBJECT | (be, in, cell) |
| ADJECTIVE | (embryonic, cell) |
| ADJECTIVE | (local, inhibitor) |
| NOBJ-PAST-PART | (inhibitor, activate) |
| PREPOSITIONAL PHRASE | (in small cells) |
| NOMINAL PHRASE | (a local inhibitor) |
| NOMINAL PHRASE | (Antp) |

The method continues to step S3300, and obtains a noun that appears in both the direct object relation and the relation describing a noun object modifying a past participle. In this example, the noun is "inhibitor." Next, in step S3400, the active form of the past participle verb appearing with the noun is obtained by applying derivational morphology. In this example, from the past participle verb "activated," the active form "activate" is obtained.

The method then continues to step S3500, and rewrites the syntactic dependencies according to, for example, the following criteria:

| | |
|---|---|
| SUBJECT (X, Be) → | DIRECT OBJECT (V, X) |
| DIRECT OBJECT (Be, Y) → | ATTRIBUTE (X, Y) |
| INDIRECT OBJECT (Be, prep, Z) → | INDIRECT OBJECT (V, prep, Z) |
| NOBJ-PAST-PART (Y, V) → | 0 |
| NOUN MODIFIER (Y, prep, Z) → | 0 |

In this example, the dependencies become as shown in Table 3.

TABLE 3

| Before | After |
|---|---|
| SUBJECT (Antp, be) | DIRECT OBJECT (activate, Antp) |
| DIRECT OBJECT (be, inhibitor) | ATTRIBUTE (Antp, inhibitor) |
| INDIRECT OBJECT (be, in, cell) | INDIRECT OBJECT (activate, in, cell) |
| ADJECTIVE (local, inhibitor) | ADJECTIVE (local, inhibitor) |
| ADJECTIVE (embryonic, cell) | ADJECTIVE (embryonic, cell) |
| NOBJ-PAST-PART (inhibitor, activate) | |
| NOUN MODIFIER (inhibitor, in, cell) | |
| PREPOSITIONAL PHASE (in embryonic cells) | PREPOSITIONAL PHRASE (in embryonic cells) |
| NOMINAL PHRASE (a local inhibitor) | NOMINAL PHRASE (a local inhibitor) |
| NOMINAL PHRASE (Antp) | NOMINAL PHRASE (Antp) |

Figure 5:
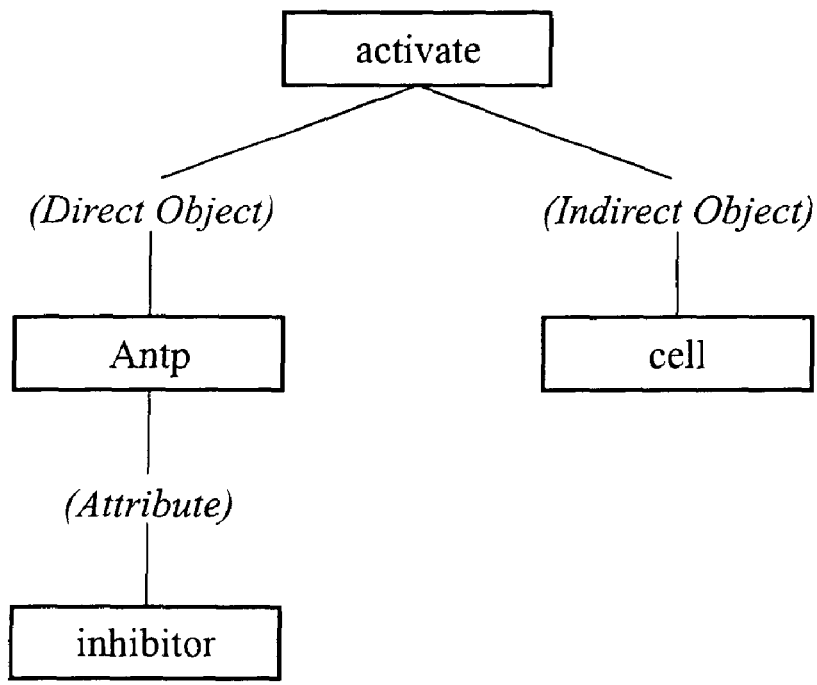
FIG. 5 is a dependency graph illustrating a result of a first exemplary syntactic modification according to the sub-method of FIG. 4.

FIG. 5 is a dependency graph illustrating a result of a first exemplary syntactic modification according to the sub-method of FIG. 4.

If the sentence contains a "be" verb and a postponed agent of a past participle verb (referred to hereafter as PAGENT) instead of a prepositional phrase, then the rewriting rules at step S3500 are slightly different. In this case, a PAGENT related to the indirect object involving the "be" verb is rewritten into a SUBJECT dependency, as follows:

| | |
|---|---|
| PAGENT (V, prep, Z) → | SUBJECT (Z, V) |
| INDIRECT OBJECT (be, by, Z) → | 0 |

In this example, the dependencies become as shown in Table 4.

TABLE 4

| Before | After |
|---|---|
| SUBJECT (Antp, be) | DIRECT OBJECT (activate, Antp) |
| DIRECT-OBJECT (be, inhibitor) | ATTRIBUTE (Antp, inhibitor) |
| INDIRECT-OBJECT (be, by, gene) | |
| ADJECTIVE (local, inhibitor) | ADJECTIVE (local, inhibitor) |
| PAGENT (activate, by, gene) | SUBJECT (gene, activate) |
| NOBJ-PAST-PART (inhibitor, activate) | |
| PREPOSITIONAL PHRASE (by the BicD gene) | PREPOSITIONAL PHRASE (by the BicD gene) |

TABLE 4-continued

| Before | After |
|---|---|
| NOMINAL PHRASE (a local inhibitor) | NOMINAL PHRASE (a local inhibitor) |
| NOMINAL PHRASE (Antp) | NOMINAL PHRASE (Antp) |

Figure 6:
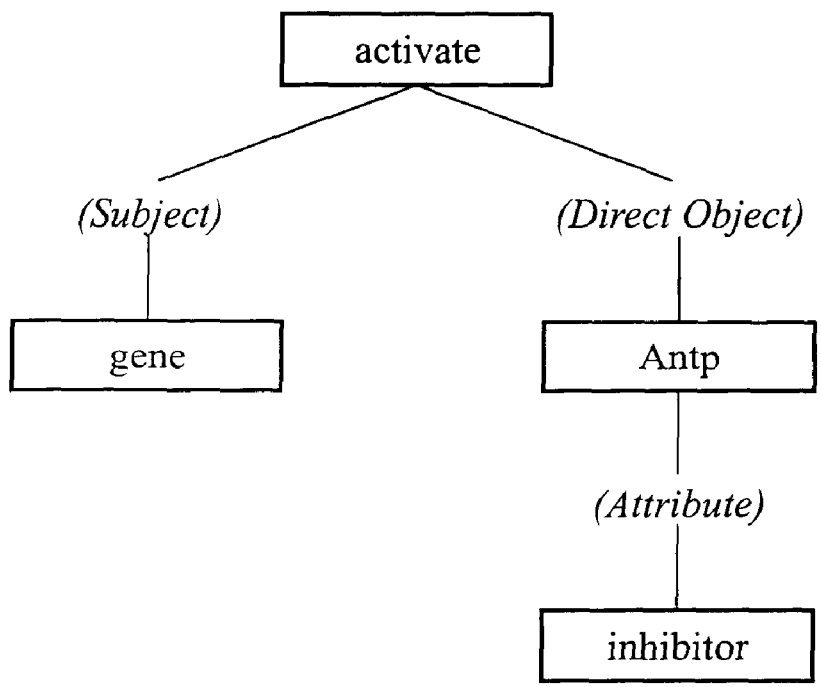
FIG. 6 is a dependency graph illustrating a result of a second exemplary syntactic modification according to the sub-method of FIG. 4.

The result of the syntactic modifications in this case is shown in the dependency graph of FIG. 6.

Figure 8:
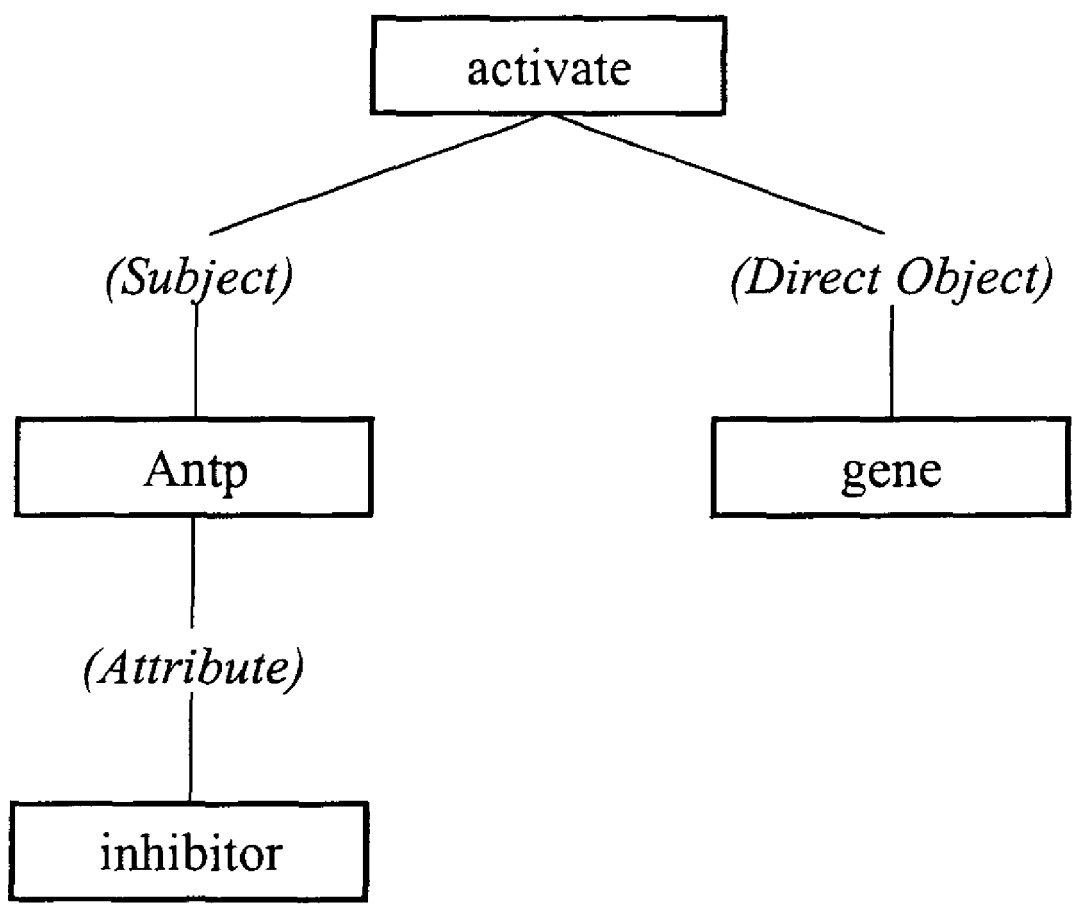
FIG. 8 is a dependency graph illustrating a result of an exemplary syntactic modification according to the submethod of FIG. 4.

It should be appreciated that graphing, such as that depicted in FIGS. 5-6 and also in FIG. 8, described hereafter, may be performed by the method or system of the invention instead of or in addition to rewriting the sentence as described above. As with the rewritten sentence, the graph may be displayed to the user, if desired, but typically will be used internally by the system or method to generate a final output to the user.

After the syntactic dependencies are rewritten and/or graphed, the method continues to step S3600 and returns.

Figure 7:
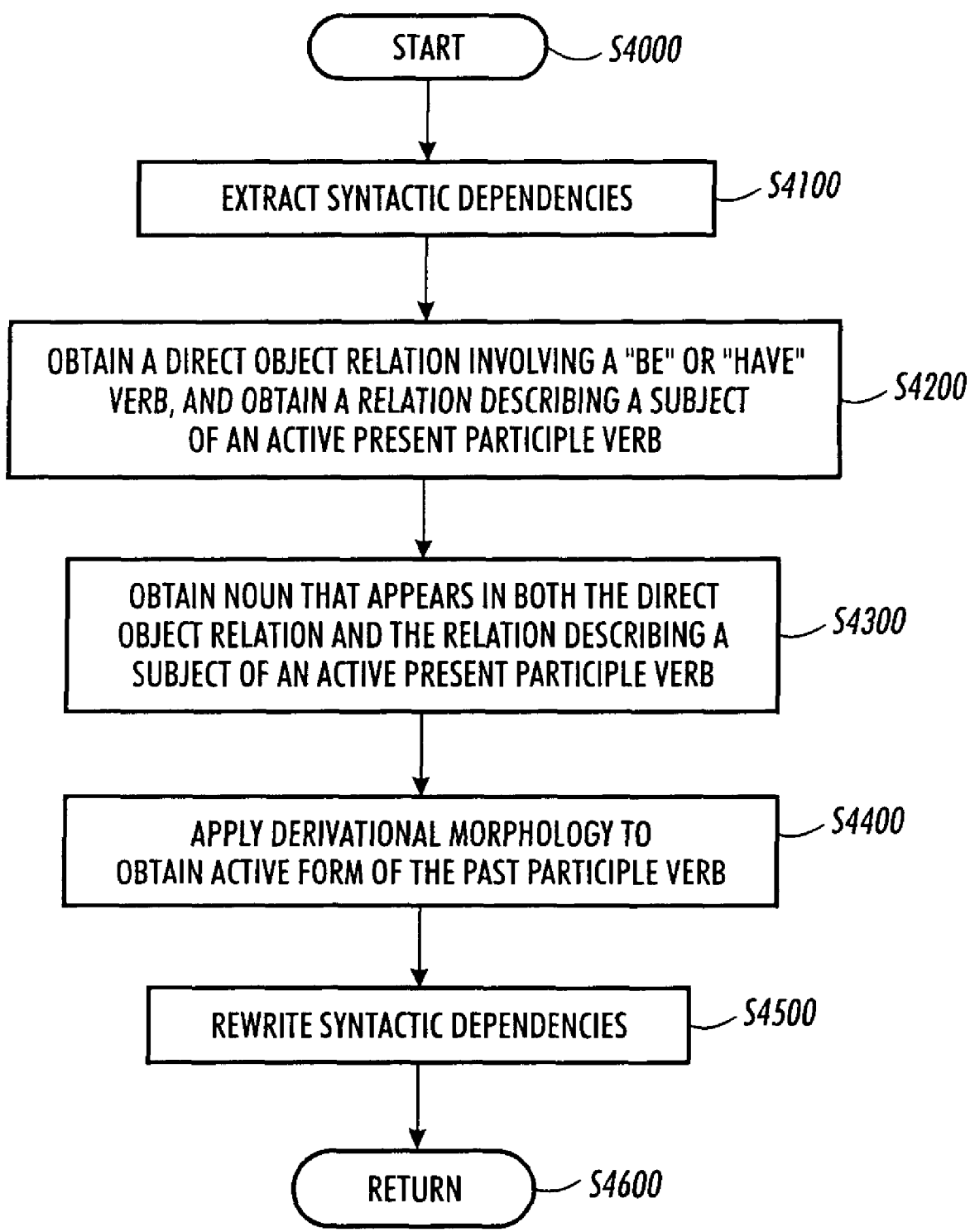
FIG. 7 is a flowchart illustrating a third exemplary submethod of normalizing a linguistic structure according to the invention.

FIG. 7 is a flowchart illustrating a third exemplary sub-method of normalizing a linguistic structure according to the invention. The sub-method illustrated in FIG. 7 is used in the case of a sentence containing a "be" verb and an active present participle verb. For example:

Antp is a local inhibitor activating the BicD gene.

Beginning in step S4000, the method continues to step S4100 and extracts the syntactic dependencies from the sentence. Continuing to step S4200, the method obtains a direct object relation involving a "be" or "have" verb, and also obtains a relation describing a subject of an active present participle verb (referred to hereafter as SUBJ-ING-VERB). For example, the relations obtained from the sentence in this example are:

| | |
|---|---|
| SUBJECT | (Antp, be) |
| DIRECT OBJECT | (be, inhibitor) |
| DIRECT OBJECT | (activate, gene) |
| ADJECTIVE | (local, inhibitor) |
| SUBJ-ING-VERB | (inhibitor, activate) |
| NOMINAL PHRASE | (the BicD gene) |
| NOMINAL PHRASE | (a local inhibitor) |
| NOMINAL PHRASE | (Antp) |

The method continues to step S4300 and obtains a noun that appears in both the direct object relation and the relation describing a subject of an active present participle verb. In this example, the noun is "inhibitor." Next, in step S4400, the active form of the present participle verb appearing with the noun is obtained by applying derivational morphology. In this example, from the present participle verb "activating," the active form "activate" is obtained.

The method then continues to step S4500, and rewrites the syntactic dependencies according to, for example, the following criteria:

| | | |
|---|---|---|
| SUBJECT (X, be) | → | SUBJECT (X, V) |
| DIRECT OBJECT (be, Y) | → | ATTRIBUTE (X, Y) |
| SUBJ-ING-VERB (Y, V) | → | 0 |

In this example, the dependencies become as shown in Table 5.

TABLE 5

| Before | After |
|---|---|
| SUBJECT (Antp, be) | SUBJECT (Antp, activate) |
| DIRECT OBJECT (be, inhibitor) | ATTRIBUTE (Antp, inhibitor) |
| DIRECT OBJECT (activate, gene) | DIRECT OBJECT (activate, gene) |
| ADJECTIVE (local, inhibitor) | ADJECTIVE (local, inhibitor) |
| SUBJ-ING-VERB (inhibitor, activate) | |
| NOMINAL PHRASE (the BicD gene) | NOMINAL PHRASE (the BicD gene) |
| NOMINAL PHRASE (a local inhibitor) | NOMINAL PHRASE (a local inhibitor) |
| NOMINAL PHRASE (Antp) | NOMINAL PHRASE (Antp) |

FIG. 8 is a dependency graph illustrating the result of the syntactic modifications of step S4500.

Referring again to FIG. 7, the method finally continues to step S4600 and returns.

The data processor 100 of FIG. 1 may be implemented on a single program general purpose computer or separate programmed general purpose computer. The data processor 100 can also be implemented on a special purpose computer, a programmed micro-processor or micro-controller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a finite state machine that is in turn capable of implementing the flowcharts shown in FIGS. 2-4 and 7, or appropriate portions thereof, can be used to implement the data processor according to this invention.

Furthermore, the disclosed methods may be readily implemented in software using, for example, object or object-oriented software development environments that provide portable source code that can be used on a variety of computer or workstation hardware platforms. Alternatively, appropriate portions of the disclosed data processor 100 may be implemented partially or fully in hardware using standard logic circuits or a VLSI design. Whether software or hardware is used to implement the systems in accordance with this invention is dependent on the speed and/or efficiency requirements of the system, the particular function, and the particular software or hardware systems or microprocessor or microcomputer systems being utilized. The processing systems and methods described above, however, can be readily implemented in hardware or software using any known or later developed systems or structures, devices and/or software by those skilled in the applicable art without undue experimentation from the functional description provided herein together with a general knowledge of the computer arts.

Moreover, the disclosed methods may be readily implemented as software executed on a programmed general purpose computer, a special purpose computer, a micro-processor, or the like. In this case, the methods and systems of this invention can be implemented as a routine embedded on a personal computer or as a resource residing on a server or workstation. The systems and methods can also be implemented by physical incorporation into a software and/or hardware system, such as an information extraction system or an automatic translation tool.

While the invention has been described in conjunction with the specific embodiments described above, many equivalent alternatives, modifications and variations may become apparent to those skilled in the art when given this disclosure. Accordingly, the exemplary embodiments of the invention as set forth above are considered to be illustrative and not limiting. Various changes to the described embodiments may be made without departing from the spirit and scope of the invention.

For example, in the methods illustrated in FIGS. 2-4 and 7, the order of various ones of the illustrated steps may be changed, additional steps may be added and/or some steps may be wholly or partially eliminated.

Additionally, when the derivational morphology device 150 described above is used to implement, for example, steps S2400, S2600, S3400 and S4400 of FIGS. 3, 4 and 7, it need only be as simple or complex as is necessary to implement the required steps.

What is claimed is:

1. A method of processing data, comprising:
   obtaining a text passage with a data processor;
   determining:
      whether the text passage may be expressed using a plurality of different linguistic constructions;
      whether the text passage contains one of a "be" verb and a "have" verb;
      whether the text passage contains a noun object preceding a past participle; and
      whether the text passage contains an active present participle verb; and
   when the text passage contains one of a "be" verb and a "have" verb, but does not contain a noun object preceding a past participle or an active present participle verb, obtaining one or more first syntactic dependencies from the text passage, obtaining a first direct object relation involving the one of a "be" verb and a "have" verb, obtaining a verbal form of a first noun appearing in the first direct object relation, and rewriting the one or more first syntactic dependencies based on the verbal form of the first noun;
   when the text passage contains one of a "be" verb and a "have" verb and also contains a noun object preceding a past participle verb, but does not contain an active present participle verb, obtaining one or more second syntactic dependencies from the text passage, obtaining a second direct object relation involving the one of a "be" verb and a "have" verb, confirming that a second noun appears in both the second direct object relation and a relation in which the noun object precedes the past participle verb, obtaining an active form of the past participle verb, and rewriting the one or more second syntactic dependencies based on the active form; and
   when the text passage contains one of a "be" verb and a "have" verb and also contains an active present participle verb, but does not contain a noun object preceding a past participle verb, obtaining one or more third syntactic dependencies from the text passage, obtaining a third direct object relation involving the one of a "be" verb and a "have" verb, confirming that a third noun appears in both the third direct object relation and a relation involving the active present participle verb, obtaining an active form of the present participle verb, and rewriting the one or more third syntactic dependencies based on the active form.

2. The method of claim 1, further comprising deciding whether to display a rewritten sentence after rewriting the syntactic dependencies.

3. A hardware data processor, comprising:
   a parser that obtains syntactic dependencies from a text passage;
   a derivational morphology device that obtains a plurality of different linguistic constructions of input words;
   a syntactic structure modifier that modifies the syntactic dependencies of the text passage; and
   a controller, wherein, in conjunction with operations of one or more of the parser, the derivational morphology device and the syntactic structure modifier, the controller:
      determines at least one of:
         whether the text passage contains one of a "be" verb and a "have" verb;
         whether the text passage contains a noun object preceding a past participle; and
         whether the text passage contains an active present participle verb; and
   when the text passage contains one of a "be" verb and a "have" verb, but does not contain a noun object preceding a past participle or an active present participle verb, obtains one or more first syntactic dependencies from the text passage, obtains a first direct object relation involving the one of a "be" verb and a "have" verb, obtains a verbal form of a first noun appearing in the first direct object relation, and rewrites the one or more first syntactic dependencies based on the verbal form of the first noun;
   when the text passage contains one of a "be" verb and a "have" verb and also contains a noun object preceding a past participle verb, but does not contain an active present participle verb, obtains one or more second syntactic dependencies from the text passage, obtains a second direct object relation involving the one of a "be" verb and a "have" verb, confirms that a second noun appears in both the second direct object relation and a relation in which the noun object precedes the past participle verb, obtains an active form of the past participle verb, and rewrites the one or more second syntactic dependencies based on the active form; and
   when the text passage contains one of a "be" verb and a "have" verb and also contains an active present participle verb, but does not contain a noun object preceding a past participle verb, obtains one or more third syntactic dependencies from the text passage, obtains a third direct object relation involving the one of a "be" verb and a "have" verb, confirms that a third noun appears in both the third direct object relation and a relation involving the active present participle verb, obtains an active form of the present participle verb, and rewrites the one or more third syntactic dependencies based on the active form.

4. A translation tool including the hardware data processor of claim 3.

5. An information extraction tool including the hardware data processor of claim 3.

6. A question answering tool including the hardware data processor of claim 3.

7. The hardware data processor of claim 3, wherein the controller decides whether to display a rewritten sentence after rewriting the syntactic dependencies.

* * * * *